United States Patent [19]

Holz et al.

[11] Patent Number: 5,056,893
[45] Date of Patent: Oct. 15, 1991

[54] DISPLAY DEVICE

[75] Inventors: Hermann Holz, Erbach; Rolf Salzmann, Berghülen-Bühlenhausen; Wolfram Wiemer, Blaustein, all of Fed. Rep. of Germany

[73] Assignee: Licentia Patent-Vertwaltungs-GmbH, Frankfurt am Main, Fed. Rep. of Germany

[21] Appl. No.: 496,586

[22] Filed: Mar. 21, 1990

[30] Foreign Application Priority Data

Mar. 31, 1989 [DE] Fed. Rep. of Germany ....... 3910418

[51] Int. Cl.⁵ .............................................. G02F 1/13
[52] U.S. Cl. .............................................. 359/54; 359/62
[58] Field of Search ........................ 350/333, 334, 336

[56] References Cited

U.S. PATENT DOCUMENTS

| | | | |
|---|---|---|---|
| 4,812,017 | 3/1989 | Piper | 350/333 |
| 4,850,675 | 7/1989 | Hatanaka et al. | 350/333 |
| 4,874,227 | 10/1989 | Matsukawa et al. | 350/334 |

FOREIGN PATENT DOCUMENTS

| | | | |
|---|---|---|---|
| 0179913 | 5/1986 | European Pat. Off. | |
| 0024597 | 2/1979 | Japan | 350/336 |
| 0034256 | 3/1979 | Japan | 350/334 |
| 0002821 | 1/1983 | Japan | 350/336 |
| 60-108820 | 6/1985 | Japan | |
| 0203915 | 10/1985 | Japan | 350/334 |
| 0105219 | 4/1989 | Japan | 350/333 |
| 2151832 | 7/1985 | United Kingdom | |

*Primary Examiner*—Michael C. Wimer
*Assistant Examiner*—Tan Ho
*Attorney, Agent, or Firm*—Spencer & Frank

[57] ABSTRACT

A display device which includes a matrix array of rectangular liquid crystal display elements on a base, all of the display elements of the array having a same height. The matrix array is arranged in rows and columns with uniform gaps between the columns. The base has lateral edges spaced from the outer columns for abutting lateral edges of other display devices. The display elements of the middle columns between the outer columns all have a same width. In order to maintain the same periodicity between the adjacent outside columns of adjacent display devices as is present between the columns within each display device, the display elements of the outer columns have a smaller width than the width of the display elements of the middle columns so as to compensate for enlarged distances between the outside columns and the lateral edges.

12 Claims, 1 Drawing Sheet

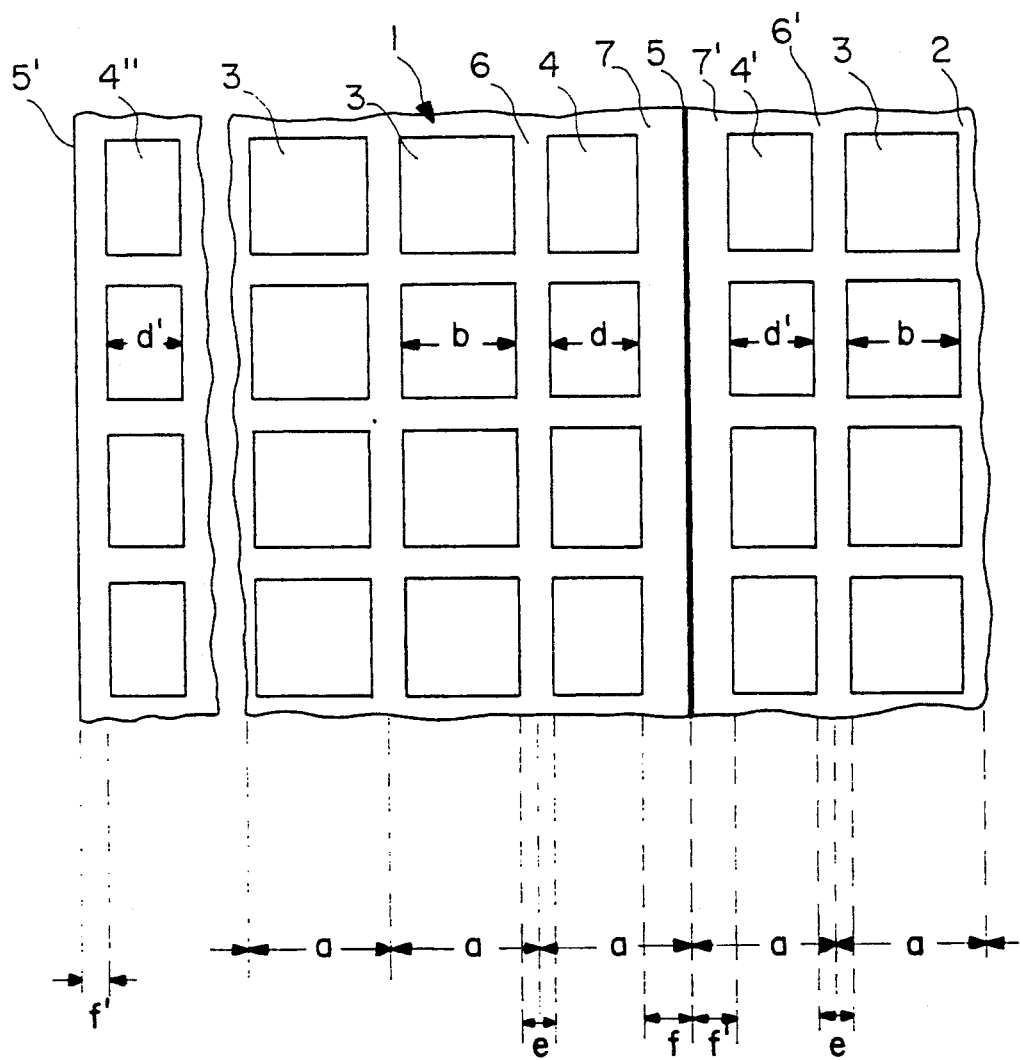

DISPLAY DEVICE

CROSS REFERENCE TO RELATED APPLICATIONS

This application claims the priority of Federal Republic of Germany application Ser. No. P 39 10 418.4 filed Mar. 31st, 1989, which is incorporated herein by reference.

BACKGROUND OF THE INVENTION

The present invention relates to a display device which uses liquid crystals as display elements, and more particularly to such a display device which includes rectangular display elements which are arranged in a matrix and the lateral edges and boundary regions of which are configured in such a manner that a plurality of such display devices can be placed next to one another in a row.

Such a matrix liquid crystal display device is disclosed, for example, in British patent No. 2,151,832. In the liquid crystal display device, two transparent glass cover plates enclose a liquid crystal material. The cover plates are sealed together hermetically along their circumferences. The display elements, formed by the liquid crystal material and electrodes photolithographed onto the glass, are separated from each other so that spaces or gaps of predetermined widths are provided between adjacent rows and columns of the display elements of each display device such that the matrix array of display elements has uniform raster dimensions. However, if several matrix display devices are arranged next to one another, larger spaces typically occur between columns at the edges of adjacent display devices than between the columns of the individual display devices. When viewing an image on such an arrangement of display devices, the difference in spacing can be noticeable and is therefore unsatisfactory in appearance.

SUMMARY OF THE INVENTION

It is an object of the invention to provide improved liquid crystal display devices in which the enlarged spaces between columns at the edges of juxtaposed devices have a better appearance.

This is accomplished in accordance with the invention by forming the display elements of at least one of the outer columns with a smaller width than the width of the display elements of the remaining columns, the width of the display elements of the remaining columns and the height of all of the display elements being the same.

The invention is based on the recognition that variable widths of the columns of display elements are less adverse to the overall visual impression if the display elements are reduced in width, than if the periodicity of the column spacing is disturbed.

BRIEF DESCRIPTION OF THE DRAWING

The sole drawing FIGURE is a partial, schematic plan view of a preferred embodiment of the display device according to the invention.

DESCRIPTION OF THE PREFERRED EMBODIMENT

The sole FIGURE shows portions of two matrix liquid crystal display devices 1 and 2 arranged next to one another in the direction of their rows of rectangular display elements 3, 4 and 4'. The columns of display elements 3, 4, and 4' of each display device have intra-display device spaces or gaps therebetween of a fixed width e. The display devices 1 and 2 have respective bases (housings) 6 and 6' which abut one another along a lateral abutment edge 5. The respective portions 7 and 7' of the bases 6 and 6' bordering the edge 5, that is the portions between the columns of display elements 4 and 4' and the edge 5, have respective widths f and f' which are greater than one half of the width e of the gaps between the adjacent columns. The display elements 3 and 4 all have a same height.

According to the invention, the display elements 3 of the middle columns of each display device 1 and 2 have a greater width b than the display elements 4 and 4' forming the outer columns, which have respective reduced widths d and d'. In the illustrated embodiment the display elements 3 of the middle columns are square, the width d and d' of the display elements 4 and 4' are the same, and the widths f and f' are the same. The display elements 3, 4 and 4' are otherwise of conventional design.

The widths d and d' of display elements 4 in the outer columns of display devices 1 and 2 are advisably selected so that the raster pattern remains the same, i.e. when seen essentially over each entire row whose display elements belong to at least two juxtaposed display devices, the spacing a between the centers of the gaps separating the columns of display elements 3 and 4 is the same. This may be accomplished in the illustrated embodiment by reducing the combined width (d+d') of the display elements 4 and 4', relative to twice the width b of the display elements 3 by the difference between (1) the combined width (f+f') of the adjacent boundary portions 7 and 7', forming an inter-display device gap, between adjacent columns of display elements 4 and 4', and (2) the width of the intra-display device gap width e; that is, by providing the display elements 4 and 4' with width d and d' satisfying the following equation:

$$d+d'=2b-(f+f'-e)=2b+e-f-f'.$$

If f=f' and d=d' as in the disclosed embodiment, then the widths d and d' may be determined according to $$d=d'=b+e/2-f.$$

The other lateral edge 5' of the display device 1 and the outer column of display elements 4" of the display device 1, are parallel to the lateral edge 5. The display units 4" have a width d' and are spaced from the lateral edge 5' by the width f' so that an identical display unit in abutment with the edge 5' will continue the periodicity of the column spacing.

In the preferred embodiment, the width of the display elements of the outer columns is between 5 and 25% less, preferably between 10 and 20% less, than the width of the display elements of the middle columns.

It will be understood that the above description of the present invention is susceptible to various modifications, changes and adaptations, and the same are intended to be comprehended within the meaning and range of equivalents of the appended claims.

We claim:

1. A display device, comprising:
    a base, said base having a lateral edge for abutting a lateral edge of another display device; and
    a matrix array of rectangular liquid crystal display elements disposed on said base, said matrix array being arranged in rows and columns, said columns extending in a direction generally parallel to said lateral edge of said base and including outer columns and middle columns between said outer columns, said rows extending in a direction generally perpendicular to said lateral edge of said base, all of the display elements of said array having a same height measured in the direction of said columns, the display elements of said middle columns all having a same width measured in the direction of said rows, the display elements of at least one of said outer columns have a smaller width than the width of the display elements of said middle columns.

2. A display device as in claim 1, wherein the display elements of said middle columns have a square shape.

3. A display device as in claim 1, wherein said outer columns comprise first and second outer columns of said display elements and said base has opposite first and second lateral edges respectively adjacent said first and second columns, and wherein the widths of the display elements of said first and second outer columns and the relative positions of all of the display elements on said base are selected so that for a plurality of such display devices juxtaposed in a row, lateral edge to lateral edge, a combined array of display elements from all of the plurality of display devices is formed with uniform raster dimensions.

4. A display arrangement, comprising a plurality of display devices, each display device including:
a base, said base having parallel lateral edges, at least one of said parallel lateral edges abutting a respective lateral edge of a base of another of said display devices; and
a matrix array of rectangular liquid crystal display elements disposed on said base, said matrix array being arranged in rows and columns, the columns extending in a direction generally parallel to said parallel lateral edges and including outer columns and middle columns between said outer columns, the rows extending in a direction generally perpendicular to said parallel lateral edges, the display elements of said middle columns all having a same width measured in the direction of said rows;
the display elements of at least one outer column of each display device having a smaller width than the width of the display elements of said middle columns, such that the display elements of all of the display devices of the arrangement form a combined array of display elements having uniform raster dimensions.

5. A display device as in claim 4, wherein all of the display elements of said array have a same height measured in the direction of said columns.

6. A display device as in claim 4, wherein the display elements of each of said outer columns have a smaller width than the width of the display elements of said middle columns.

7. A display device, comprising:
a base, said base having a lateral edge for abutting a lateral edge of another display device; and
a matrix array of rectangular liquid crystal display elements disposed on said base, said matrix array being arranged in rows and columns, said columns extending in a direction generally parallel to said lateral edge of said base and including outer columns and middle columns between said outer columns, said rows extending in a direction generally perpendicular to said lateral edge of said base, the display elements of said middle columns all having a same width measured in the direction of said rows, the display elements of each of said outer columns have a smaller width than the width of the display elements of said middle columns.

8. A display device as in claim 7, wherein the width of the display elements of said outer columns is between 5 and 25% less than the width of the display elements of said middle columns.

9. A display device as in claim 8, wherein the width of the display elements of said outer columns is between 10 and 20% less than the width of the display elements of said middle columns.

10. A display device as in claim 7, wherein all of the display elements of said array have a same height measured in the direction of said columns.

11. A display device as in claim 7, wherein said outer columns comprise first and second outer columns of said display elements and said base has opposite first and second lateral edges respectively adjacent said first and second columns, and wherein the widths of the display elements of said first and second outer columns and the relative positions of all of the display elements on said base are selected so that for a plurality of such display devices juxtaposed in a row, lateral edge to lateral edge, a combined array of display elements from all of the plurality of display devices is formed with uniform raster dimensions.

12. A display device, comprising:
a base, said base having opposite first and second lateral edges for abutting respective lateral edges of other display devices; and
a matrix array of rectangular liquid crystal display elements disposed on said base, said matrix array being arranged in rows and columns, said columns extending in a direction generally parallel to said first and second lateral edges of said base, said columns including first and second outer columns, disposed respectively adjacent to said first and second edges, and middle columns between said outer columns, said rows extending in a direction generally perpendicular to said lateral edges of said base, the display elements of said middle columns all having a same width measured in the direction of said rows, the display elements of at least one of said outer columns have a smaller width than the width of the display elements of said middle columns, the widths of the display elements of said first and second outer columns and the relative positions of all of the display elements on said base being selected so that for a plurality of such display devices juxtaposed in a row, lateral edge to lateral edge, a combined array of display elements from all of the plurality of display devices is formed with uniform raster dimensions.

* * * * *